United States Patent Office 3,043,433
Patented July 10, 1962

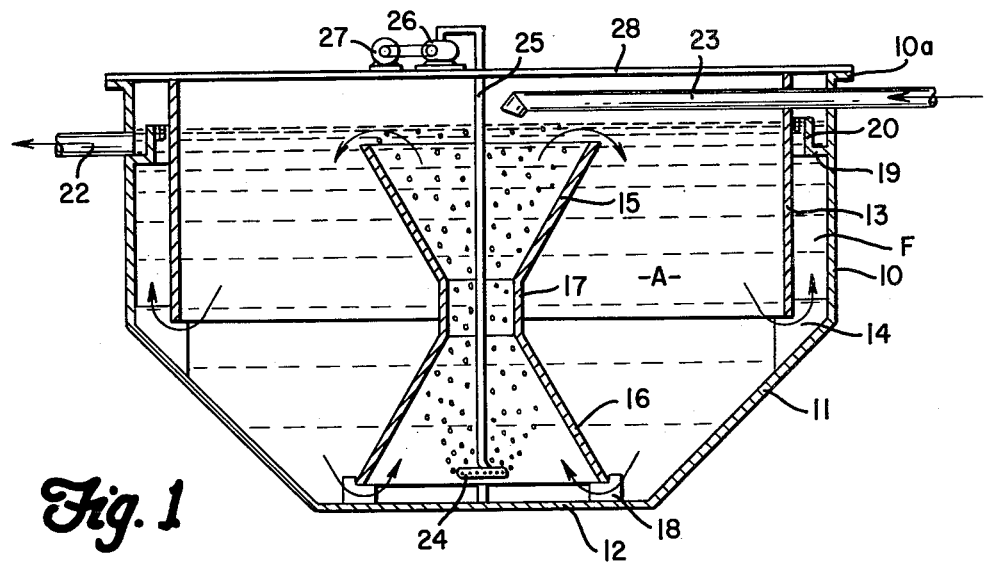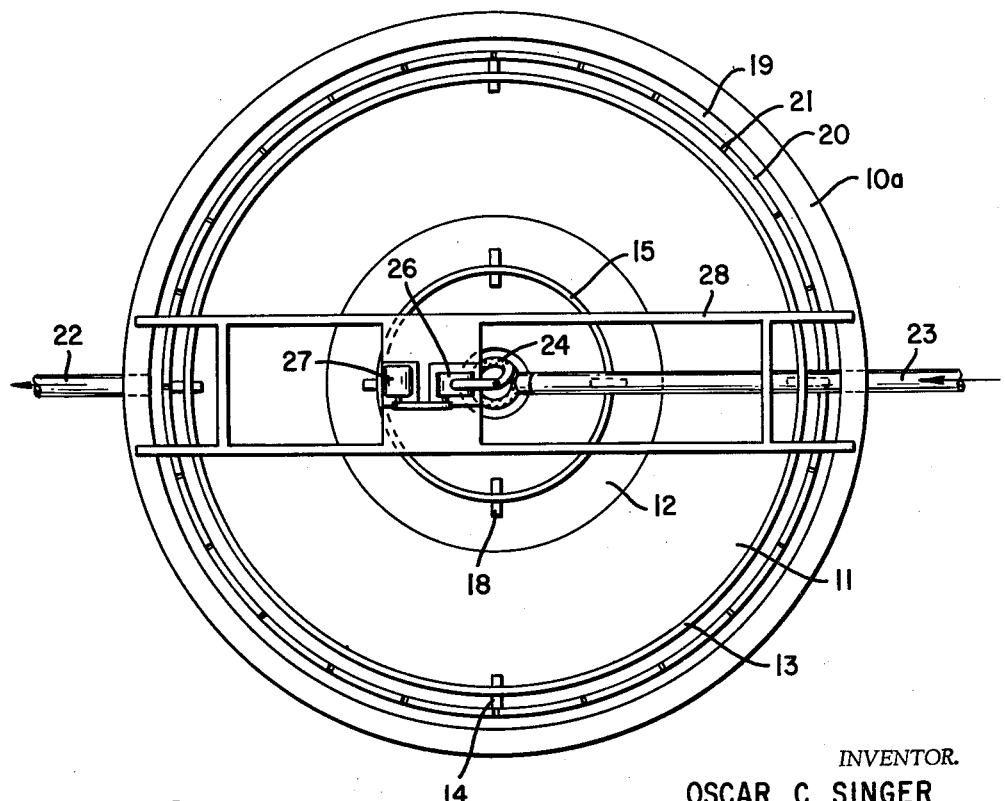

3,043,433
SEWAGE TREATMENT PLANT
Oscar Caton Singer, 1027 Greenhills, Toledo 7, Ohio
Filed May 17, 1961, Ser. No. 110,740
1 Claim. (Cl. 210—197)

This invention relates to a bio-oxidation sewage treating plant.

An object is to produce a bio-oxidation sewage treating plant which constitutes a unitary installation requiring a minimum of space, but which is equipped through a new and improved arrangement of parts, with all the necessary or desirable elements for effecting efficient sewage treatment.

Other objects and advantages of the invention will hereinafter appear, and, for purposes of illustration but not of limitation, an embodiment of the invention is shown in the accompanying drawings in which FIGURE 1 is a vertical sectional elevation of a bio-oxidation sewage treating plant embodying the invention; and FIGURE 2 is a top plan view of the structure shown on FIGURE 1.

The illustrated embodiment of the invention comprises a cylindrical tank 10, having a flanged open top 10a, and an inwardly and downwardly tapered lower wall 11, which connects with a flat bottom wall 12. Disposed within the tank 10, and spaced from the cylindrical walls thereof, is a cylindrical partition wall of baffle 13, the upper edge of which is flush with the top of the tank 10, and the lower edge of which is approximately even with the upper end of the tapered wall 11. A plurality of brackets 14 support the baffle 13 in the position shown.

Disposed centrally of the tank 10 is a pair of reversely arranged upper and lower frusto-conical tubes 15 and 16 respectively, with the small ends in juxtaposed relation. These tubes are integrally joined by a relatively short, cylindrical tube 17, which provides a venturi throat. This structure is mounted on supporting brackets 18, resting on the bottom wall 12, so that the structure is elevated slightly from the bottom wall to afford free flow of liquid thereto.

Disposed slightly below the open mouth of the tank 10 is an annular trough or weir formed by a horizontal wall portion 19 and a vertical wall portion 20. Liquid may enter the trough or weir either by overflowing the upper edge of the wall 20 or through a series of slots 21. Leading from the trough or weir is an outlet tube 22, which may extend to any suitable drain area.

An inlet tube, which extends through the tank wall 10 and the baffle 13 has a down-turned end disposed directly above the upper frusto-conical tube 15, so that raw sewage may be delivered thereto in a continuous stream.

Disposed above the bottom wall 12 of the tank and within the lower frusto-conical tube 16 is a perforated annular aerator head 24, which is connected to a vertical tube 25 leading to an air pump 26, which in this instance is driven by an electric motor 27, for pumping air to the aerator head 24. As shown, the pump 26 and motor 27 are mounted on a horizontal supporting frame 28 which rests on the flange mouth 10a of the tank.

It will be understood that the sewage to be treated is introduced through the tube 23, where it discharges into the upper frusto-conical tube 15. The air supplied through the perforated head 24 causes mixed liquor to be rotated from the venturi axis to all points of the perimeter of the aeration tank, indicated on the drawing by A. When the mixed liquor and air pass the throat of the venturi at the tube 17, the pressure drops and more oxygen is absorbed by the liquor, thereby increasing the air efficiency. The air discharged from the head 24 acts as an air lift pump which pulls the sludge settling from the final settling compartment, indicated on the drawing at F, to the mixed liquor. In the final compartment F there is greater quiescence. Liquid enters through the large lower opening between the cylindrical baffle 13 and the bottom of the aeration compartment A, and such greater quiescence means better settling of the sludge. Thus, the liquor that eventually finds its way to the final settling compartment F is practically clear of sludge, and thus passes through the long peripheral weir which prevents cross currents that would otherwise interfere with good settling.

From the above, it will be manifest that the sewage treatment according to the above described plant, and which is referred to as the aerobic type, provides an exceedingly compact and efficient arrangement of parts involving a satisfactory aeration device, a final settling chamber, and sludge return arrangement for maximum organism population. It will be understood that since the velocities drop rapidly after leaving the throat of the venturi, adequate time is afforded for the oxidizing action of the bacteria. Thus, the re-circulation of the liquor is advantageous, since each time the bacteria content is re-aerated and the new supply of untreated sewage is inoculated. The fully purified materials which are almost entirely liquid eventually pass to the weir, after collecting in the final collecting chamber, and escape through the outlet pipe 22.

Numerous changes in details of construction and arrangement may be effected without departing from the spirit of the invention, especially as defined in the appended claim.

What I claim is:

A sewage treatment plant comprising a tank having a cylindrical upper wall portion, a downwardly and inwardly tapering lower wall extension thereof, and an imperforate bottom wall; a pair of reversely arranged vertically disposed frusto-conical tubes disposed generally coaxially within said tank and having a relatively short cylindrical tube integrally connecting the smaller ends thereof providing a venturi throat, the bottom of said frusto-conical tubes being spaced from the bottom wall of said tank; a cylindrical baffle wall within said tank, inwardly spaced from the upper cylindrical wall portion of said tank, defining a quiescent fluid settling chamber therebetween, and outwardly spaced from said frusto-conical tubes defining an annular aeration chamber therebetween, the lower end of said baffle wall terminating at a horizontal plane substantially level with the horizontal plane of the upper end of the tapering lower wall extension of said tank; a trough-like weir on the inner side of said upper cylindrical wall of said tank disposed to maintain the level of liquid within said tank above the upper end of the upper frusto-conical tube, said weir provided with clean liquid outlet means; a sewage inlet conduit disposed above said tank and positioned to introduce raw sewage into the zone defined by the upper one of said frusto-conical tubes; and an aerating head disposed in the lower portion of the lower one of said frusto-conical tubes communicating with a source of air under pressure to provide the emission of an air stream from said aerating head, whereby the sewage liquor in the bottom of said tank is carried upwardly by the air stream through the venturi throat of said frusto-conical tubes to the upper one of said tubes whereupon the pressure is reduced allowing more oxygen from the air stream to be absorbed by the liquor prior to the mixture thereof with the raw sewage entering the system from said sewage inlet conduit.

(References on following page)

References Cited in the file of this patent

UNITED STATES PATENTS

| | | |
|---|---|---|
| 1,179,658 | Rothwell | Apr. 18, 1916 |
| 1,867,824 | Hammerly | July 19, 1932 |
| 2,083,347 | Scholler et al. | June 8, 1937 |
| 2,538,412 | Cecil et al. | Jan. 16, 1951 |
| 2,669,440 | Lindenbergh | Feb. 16, 1954 |
| 2,779,731 | Kelly et al. | Jan. 29, 1957 |

FOREIGN PATENTS

| | | |
|---|---|---|
| 176,957 | Great Britain | Mar. 23, 1922 |